Sept. 11, 1962     A. F. LUND     3,053,668
METHOD OF PRODUCING FRUIT JUICE CONCENTRATE
Filed May 8, 1961
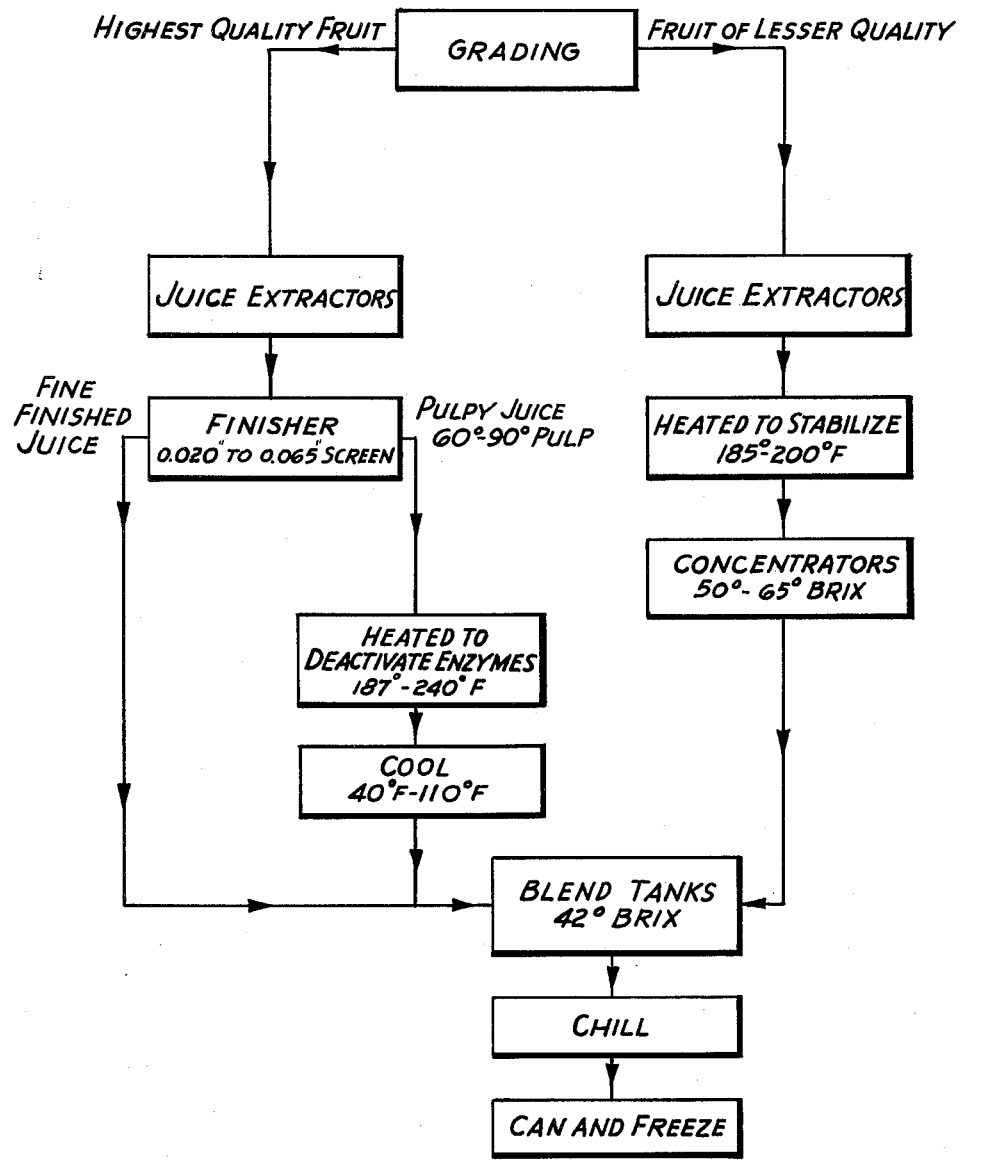
INVENTOR.
ARTHUR F. LUND
BY
ATTORNEY 3,053,668
METHOD OF PRODUCING FRUIT JUICE CONCENTRATE
Arthur F. Lund, Tampa, Fla., assignor to Cherry-Burrell Corporation, Cedar Rapids, Iowa, a corporation of Delaware
Filed May 8, 1961, Ser. No. 108,632
8 Claims. (Cl. 99—205)

This invention relates to concentrated juice products produced from fruit, especially citrus fruit. My invention is more particularly concerned with an improved method of producing a citrus juice concentrate of superior flavor and appearance, the process being one that can be practiced more easily than known processes.

Frozen, concentrated fruit juices are a well known commodity to the consumer. These frozen concentrates have been widely accepted by the public in spite of the fact that when diluted for use the appearance of the juice is not quite as good as that of fresh juice because of gelation causing separation of the reconstituted juice into fractions. This gelation is primarily attributable to the presence in the pulp of the enzyme pectinesterase. For this reason the quantity of pulp usually is reduced to a minimum even though this increases the losses in the process. Therefore, most of the known commercial processes for concentrating fresh juice include a step in which large quantities of the pulp are separated from the juice, the juice then being heated to deactivate any enzymes and thereby further increase the stability and improve the appearance and storage properties.

However, heating of the juice and the subsequent concentrating of the juice in double-effect evaporators, which is a common method, drives off the volatile flavoring compounds and thus the resultant treated concentrate lacks the flavor of fresh whole juice. There have been many methods devised to prevent the volatilization of these flavoring compounds and many of these have been partially successful. Another approach in some processes has been to attempt recovery of these flavoring compounds and return them to the final juice concentrate but the results have been somewhat unsatisfactory. There are no processes known to me than can consistently produce on a commercial scale a stable juice concentrate having flavor and appearance that approaches that of fresh whole juice.

It is therefore an object of my invention to provide an improved method that overcomes the difficulties of prior art processes and produces a fruit juice concentrate that has flavor and appearance approaching that of fresh whole juice. It is my object to devise such a method that can be practiced on a commercial scale.

It is another object of my invention to provide a method of producing fruit juice concentrates that can be easily practiced on relatively inexpensive, existing equipment.

It is another object of my invention to provide a process for producing fruit juice concentrates in which the juice is separated into fractions that can be easily handled.

These and other objects of my invention will be readily apparent from a consideration of the following description of my process which is diagrammatically illustrated in the drawing as applied to orange juice.

Each truck load of oranges received at the processing plant is sampled and the sample tested for sugar-acid ratio. On the basis of these tests, the select oranges are separated from those of lesser quality and stored in bins according to the determined grade. In my process the select fruit is withdrawn from the storage bins and processed separately through different steps than the fruit of lesser quality.

The juice from the select fruit is extracted and the juice and pulp is separated from the seeds and peel. The juice-pulp mixture is then passed through a finisher where it is divided into a fine finished juice and a pulpy juice fraction containing suspended particles of pulp that will not pass through a screen size selected from the range of 0.020" to 0.065" depending on the preference of the particular processor. I prefer to adjust the finisher so that the pulpy juice fraction contains 60–90% pulp, and preferably about 75% pulp. Thus, this pulpy juice is wet enough so that it can be handled easily in the processing equipment. I have found if the pulpy juice fraction contains more than 90% pulp, it is too dry and very difficult to pump through the equipment. The pulpy juice fraction is then heated to a temperature in the range of 187–240° F., preferably about 203° F., which deactivates the enzymes and prevents the gelation that causes separation. The heated pulpy juice is thereafter cooled to a temperature in the range of 40–110° F., and recombined in blend tanks with the fine finished juice fraction that has not been heated but passed directly from the finisher to the tanks. Note that neither fraction of the juice from the select fruit has been concentrated and therefore the juice remains at its original concentration, usually around 13° Brix. Since only the pulpy fraction has been heated, the juice therefore will have excellent flavor comparable to that of the original fresh whole juice, and even though it contains some pulp that has not been heated, the enzyme activity is not sufficient to appreciably affect the stability of the juice.

The oranges of lesser quality are simultaneously processed by first being passed through extractors. The resulting pulp-juice mixture is then heated to a temperature in the range of 185–200° F. to reduce the enzyme activity and thereby increase the stability. The heated juice is thereafter concentrated, usually in double-affect evaporators, to a concentration in the range of 50°–65° Brix, usually about 58° Brix. After the concentration step, the whole juice has almost no flavor and therefore it is passed into the blend tanks where it is mixed with the juice processed from the select fruit.

The relative amounts of the over-concentrated juice from the oranges of lesser quality and the treated whole juice from the select fruit are regulated so that the final juice withdrawn from the blend tanks is at a concentration of approximately 42° Brix. This is a ratio of about 3 to 1, the desired strength of the frozen juice concentrates presently on the market. The final concentrate is then subjected to the standard steps of chilling, canning, and freezing and then either stored or shipped.

The concentrate resulting from my novel process when diluted with water has a flavor and appearance superior to the concentrates obtained by other processes. Also, my novel process can be easily adjusted to produce the desired amount of pulp in the final concentrate, the pulp obtained from the select fruit being handled gently so that the cells are not ruptured. The fine finished juice fraction from the select fruit is not heat treated and thereby retains all the flavor of the fresh fruit, and when it is blended with the over-concentrated juice from the poorer grade fruit results in a final juice of excellent quality and flavor and one that is also very stable. Because the pulpy fraction from the select fruit contains some juice but only enough juice to make this fraction easy to handle on relatively inexpensive equipment, my process can be carried out on standard equipment without some of the problems normally associated with processes which separate the juice into a liquid and an extremely dry pulp fraction.

While I have described my novel process by way of example as applied to orange juice, it will be readily understood by those skilled in the art that it is applicable to other fruit juices by slight revisions and modifications in the temperatures and concentrations at the various steps. It is therefore my intention that such revisions and modifications as are obvious to those skilled in the art will be included within the scope of the following claims.

I claim:

1. A process for treating citrus juice comprising separating the juice into a fine liquid fraction and a pulpy liquid fraction, heating the pulpy liquid fraction to deactivate the enzymes, cooling the pulpy liquid fraction, and recombining the pulpy liquid fraction and the untreated fine liquid fraction to form a whole juice.

2. A process for treating citrus juice comprising separating the juice into a fine liquid fraction and a pulpy liquid fraction containing 60–90% pulp, heating the pulpy fraction to deactivate the enzymes, cooling the pulpy fraction, and recombining the pulpy liquid fraction and the untreated fine liquid fraction to form a whole juice.

3. A process for treating citrus juice comprising separating the juice into a fine liquid fraction and a pulpy liquid fraction containing 60–90% pulp, heating the pulpy fraction to a temperature in the range of 187° to 240° F., cooling the pulpy liquid fraction to a temperature between 40° and 110° F., and recombining the pulpy liquid fraction and the untreated fine liquid fraction to form a whole juice.

4. A process for producing a concentrated juice product from fresh fruit comprising the steps of, grading the fruit as to quality, extracting the juice from selected fruit of the highest quality, separating the juice into a pulpy fraction and a liquid fraction, heating the pulpy fraction to deactivate the enzymes, cooling the pulpy fraction, recombining the pulpy fraction and the liquid fraction to form treated whole juice, extracting the juice from the fruit of lesser quality, heating the extracted juice, concentrating the heated juice to a concentration higher than the final concentrated product, and combining the treated whole juice with the overconcentrated juice to form a final product of the desired concentration.

5. A process for producing a concentrated juice product from fresh fruit comprising the steps of, grading the fruit as to quality, extracting the juice from selected fruit of the highest quality, separating the juice into a pulpy fraction and a liquid fraction, heating the pulpy fraction to deactivate the enzymes, cooling the pulpy fraction, recombining the pulpy fraction and the liquid fraction to form treated whole juice, extracting the juice from the fruit of lesser quality, heating the extracted juice, concentrating the heated juice to a concentration between 50° and 65° Brix, and combining a sufficient amount of the treated whole juice with the overconcentrated juice to form a final product of approximately 42° Brix concentration.

6. The process of claim 5 in which the pulpy fraction contains 60% to 90% pulp.

7. The process of claim 6 in which the pulpy fraction is heated to a temperature in the range of 187° to 240° F. and cooled to a temperature between 40° and 110° F.

8. The process of claim 7 in which the juice extracted from the fruit of lesser quality is heated to a temperature in the range of 185° to 200° F.

References Cited in the file of this patent
UNITED STATES PATENTS

| 2,724,652 | Brent | Nov. 22, 1955 |
| 2,903,372 | Walker | Sept. 8, 1959 |